Dec. 10, 1935.  H. G. WARREN  2,023,454
PROPELLER
Filed Feb. 4, 1935
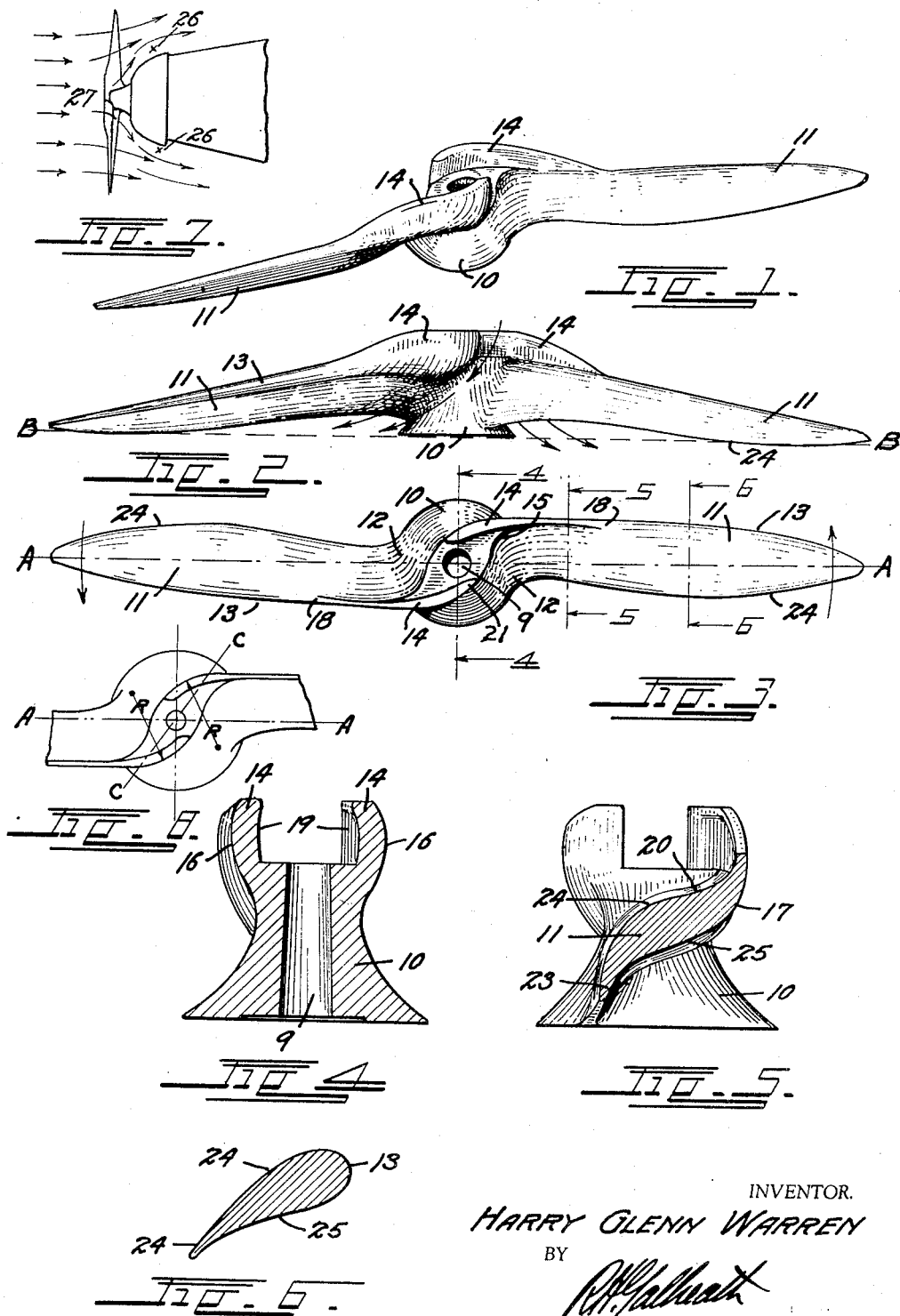
INVENTOR.
HARRY GLENN WARREN
BY
ATTORNEY.

Patented Dec. 10, 1935

2,023,454

UNITED STATES PATENT OFFICE 2,023,454

PROPELLER

Harry Glenn Warren, Pasadena, Calif., assignor to William H. Lyman, Inc., a corporation of Colorado Application February 4, 1935, Serial No. 4,736

10 Claims. (Cl. 170—159)

This invention relates to an aircraft propeller. The hub area of the usual aircraft propeller not only fails to exert any propelling action but actually produces head resistance or drag which detracts from the efficiency of the entire propeller.

The principal object of this invention is to provide a propeller design in which the air stream striking the hub zone of the propeller will be utilized to increase the efficiency of blades.

Another object of the invention is to construct a hub section for propellers which will create an air flow of a type to produce a vacuum area on the nose of the engine housing or fuselage, thereby increasing the efficiency and speed.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

Fig. 1 is a perspective view of the improved propeller.

Fig. 2 is a side view thereof.

Fig. 3 is a front view thereof.

Fig. 4 is a detail section through the hub portion, taken on the lateral center line 4—4, Fig. 3.

Fig. 5 is a similar section, taken on the line 5—5, Fig. 3.

Fig. 6 is a section through the blade, taken on the line 6—6, Fig. 3.

Fig. 7 is a diagrammatic view illustrating the air flow of the propeller on the nose of an engine housing.

Fig. 8 is a front view showing the curvature of the leading edge of the blades.

The improved propeller comprises a hub 10, having a concave frusto-conical shape and provided with the usual shaft bore 9. Blades 11 extend outwardly from the hub 10. The propeller, as illustrated, is provided with two oppositely extending blades. It could, however, be provided with three, four, or more equally spaced blades. The blades 11 join the hub 10 along a helical line, as indicated by the fillets 12, so as to provide a tapering air screw at the hub.

The leading edge of each blade, indicated at 13, extends inwardly beyond the lateral axis 4—4 of the propeller and swings about the shaft bore 9 on a radius eccentric to said axis, as indicated at R, Fig. 8.

Along the inner or axial portion of the leading edge 13, a flange 14 is raised. This flange extends inwardly around the axial curved portion of the leading edge terminating slightly beyond the axial center line 4—4, as shown at 21. The leading edge continues beyond the extremity 21 of the flange 14 to the inner face of the opposite flange 14, as indicated by the curve 15.

In cross section, the outer or leading face of the flange 14 is rounded, as indicated at 16, Fig. 4, into a reverse curve which blends into the concave surface of the hub 10. As the cross-section 5—5 is approached, the rounded forward face of the flange blends into the pressure face 25 of the blade 11, as indicated by the curve 17, in Fig. 5. The height of the flange gradually decreases away from the axis until it blends into the leading edge of the blade as indicated at 18, Fig. 3, and the section of Fig. 6 is evolved.

The inner or trailing face of the flange 14, indicated at 19, Fig. 4, is preferably, but not necessarily, concave, and this concavity blends into the vacuum face 24 of the blade 11 on a reverse curve as indicated at 20, as the section of Fig. 5 is approached.

The trailing edge of the blades 11 is curved rearwardly to provide a trailing edge flange 23 which is rather steep adjacent the hub 10 but gradually straightens and blends into the usual blade trailing edge, as shown at 24, Fig. 6.

The combination of the rounded flange faces 16, the concave hub face, and the helical joining line of the blade to the hub provides a helical air channel from the hub zone which extends rearwardly and outwardly as indicated by the arrows of Fig. 2.

In use, the propeller, as shown in Fig. 3, rotates in an anti-clockwise direction. The two internal end points 21 of the flanges 14 acting as an air screw enter into the zone of air ahead of the hub section of the propeller and force and direct a stream of air through the helical channel about the hub 11 into the pressure zone behind the pressure faces 25 of the blades 11. The great influx of air from the hub area greatly increase the density of the air on the pressure side of the blades, and provides a more resisting area for the blades to act against. This screwing or whirling of the air away from the hub area also creates a vacuum pocket immediately ahead of the axial portion of the propeller, greatly increasing the efficiency thereof, and eliminating drag thereon. The upwardly turned flanges 14, in addition to forcing air beneath the pressure faces of the blades also act to create a vacuum area in the rear of the flanges opposite the curved inner surfaces 19, which still further increases the vacuum zone ahead of the hub portion of the propeller and on the vacuum faces 24 of the blades.

When in place on a fuselage, engine nacelle, or engine hood, as indicated in Fig. 7, the flaring spiral of air thrown from the air channels about the concave conical hub section creates a flaring helical surface air stream 26 which swings outwardly beyond the surface of the nose of the engine hood, this creating a vacuum or low pressure zone about forward face of the engine hood, as indicated at 27. This action greatly reduces the head resistance on the engine hood, and greatly increases the efficiency of the entire assembly.

To take still further advantage of the flaring pressure zone from the hub air channels, it is preferred to swing the blades rearwardly at their extremities as can be noted by comparison of the blade lines with the base line B—B, of Fig. 2. This places a greater length of the blades in the increased pressure area.

It is also preferred to place the hub extremities of the blades ahead of the blade center line, indicated at A—A, Figs. 3 and 8, and allow the peripheral extremities to trail slightly behind the center line as shown in Fig. 3. This also allows the blade to take greater advantage of the increased pressure zone.

It can be readily seen from the above, that the usual head resistance at the hub area has been reduced to a partial vacuum zone and that the air that formerly created the head resistance has been used to advantage in a properly positioned pressure zone to increase the efficiency of the propeller blades.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. An airplane propeller comprising: a frusto-conical hub section; blades extending outwardly from said hub section and joining the conical surface of the latter along helical lines; and an upstanding flange along the leading edge and on the vacuum face of each blade, said flanges being positioned adjacent the axis of rotation, said flange decreasing in height and blending into the leading edge of said blade at less than half its length.

2. An aircraft propeller comprising: a conical hub portion; blades extending outwardly from said hub portion and joining the latter along helical lines; a forwardly extending flange along the leading edge of each of said blades; a rearwardly extending flange along the trailing edge of each of said blades, said flanges having a maximum height adjacent the axis of rotation and blending into said blades before the middle of the latter are reached.

3. An airplane propeller comprising: a frusto-conical hub section; blades extending outwardly from said hub section and joining the conical surface of the latter along helical lines, said blades being inclined rearwardly so that adjacent their tips they will be substantially on a line with the rear face of said hub.

4. An airplane propeller comprising: a frusto-conical hub section; blades extending outwardly from said hub section and joining the conical surface of the latter along helical lines, said blades being positioned with reference to said hub section so that adjacent the latter the major portion of each blade will be positioned ahead of the longitudinal center line of the propeller and adjacent its tip the major portion will trail said center line.

5. An airplane propeller comprising: a frusto-conical hub and blades extending outwardly from said hub and joining the conical surface of the latter along helical lines, said blades being so shaped and positioned that a straight line drawn from the axis of said hub to the extreme tip of a blade will intersect the middle of said blade at approximately two thirds of its length from said axis, the major portion of said blade between said axis and said intersection being positioned ahead, in the direction of rotation, of said line.

6. An airplane propeller comprising: a hub and blades joining said hub along helical lines, each of said blades being relatively straight so that a straight line drawn from the axis of said hub to the extreme tip of a blade will lie wholly within the blade, said blades being inclined rearwardly so that the tips of said blades will rotate in a plane to the rear of the plane of rotation of the axial portions thereof.

7. An airplane propeller comprising: a hub and blades joining said hub along helical lines, each of said blades being relatively straight so that a straight line drawn from the axis of said hub to the extreme tip of a blade will lie wholly within the blade, said blades being inclined rearwardly so that the tips of said blades will rotate in a plane to the rear of the plane of rotation of the axial portions thereof, the major portion of each blade being positioned ahead, in the direction of rotation, of said line adjacent said hub and behind said line as the tip of said blade is approached.

8. An airplane propeller comprising: a frusto-conical hub section; blades extending outwardly from said hub section and joining the conical surface of the latter along helical lines, said blades being positioned with reference to said hub section so that adjacent the latter the major portion of each blade will be positioned ahead of the longitudinal center line of the propeller and adjacent its tip the major portion will trail said center line, said blades being inclined rearwardly so that they form an acute angle with the axis of said hub section on the rear or pressure side of said propeller.

9. An airplane propeller comprising: a frusto-conical hub section; blades extending outwardly from said hub section and joining the conical surface of the latter along helical lines, the major portion of each blade being positioned ahead of the longitudinal center line of the propeller adjacent the hub section and behind said center line, adjacent the top thereof, said blades being inclined rearwardly at each side of the axis of said propeller so that they will travel in a relatively flat conical path.

10. An airplane propeller comprising: a frusto-conical hub section; blades extending outwardly from said hub section and so positioned that a line drawn between the extreme blade tips will pass through the axis of said hub section, the leading edges of said blades being positioned forwardly of said line at the axial portions thereof and intersecting the lateral center line at opposite sides of said hub section so that when said blades are rotating the inner extremities thereof will be swung endwise into the air.

HARRY GLENN WARREN.